(12) United States Patent
Eisenhauer

(10) Patent No.: US 7,231,836 B2
(45) Date of Patent: Jun. 19, 2007

(54) DEVICE FOR MONITORING AN AIR SUPPLY FLOW OR A VOLUMETRIC AIR FLOW

(75) Inventor: Hartmut Eisenhauer, Michelfeld (DE)

(73) Assignee: STEGO-Holding GmbH, Schwaebisch Hall (DE)

( * ) Notice: Subject to any disclaimer, the term of this patent is extended or adjusted under 35 U.S.C. 154(b) by 132 days.

(21) Appl. No.: 10/532,558

(22) PCT Filed: Oct. 30, 2003

(86) PCT No.: PCT/EP03/12101

§ 371 (c)(1),
(2), (4) Date: Apr. 22, 2005

(87) PCT Pub. No.: WO2004/040203

PCT Pub. Date: May 13, 2004

(65) Prior Publication Data

US 2006/0042400 A1 Mar. 2, 2006

(30) Foreign Application Priority Data

Oct. 31, 2002 (DE) .............................. 102 50 873

(51) Int. Cl.
*G01F 1/28* (2006.01)
(52) U.S. Cl. .................................................. 73/861.74
(58) Field of Classification Search ............. 73/861.74, 73/861.75
See application file for complete search history.

(56) References Cited

U.S. PATENT DOCUMENTS 3,992,598 A * 11/1976 Welsh et al. ........... 200/81.9 M 6,446,600 B1  9/2002 Scherer et al. .............. 123/399

FOREIGN PATENT DOCUMENTS

| DE | 2744901 A1 * | 6/1977 |
| DE | 27 44 901 | 4/1979 |
| DE | 42 02 600 C2 | 8/1992 |

(Continued)

OTHER PUBLICATIONS

International Search Report in PCT/EP03/12101 dated Feb. 26, 2004.
International Preliminary Examination Report in PCT/EP03/12101 dated Dec. 6, 2004.

*Primary Examiner*—Jewel Thompson
(74) *Attorney, Agent, or Firm*—Marshall, Gerstein & Borun LLP

(57) ABSTRACT

The invention relates to a device for monitoring an air supply flow or a volumetric air flow, in particular for ventilators which can also be applied for extremely low flow speeds and/or throughput rates. The aim of the invention is to produce a device cheaply and simply with essentially wear-free components which reacts to changes in the flow speed and/or the throughput rate without a time delay. Said aim is achieved, whereby the device comprises an approach flow device, the position of which may be altered relative to a mounting, against a retaining force $F_M$ and which may be impinged by the air flow for monitoring to generate a change in the position thereof. Furthermore, magnetic devices for the generation of a magnetic field dependent on the position of the approach flow device, detection means for recording the magnetic field and measuring means for generation of a measured signal dependent on the magnetic field are provided. The magnetic field forms at least a part of the retaining force $F_M$.

16 Claims, 1 Drawing Sheet

FOREIGN PATENT DOCUMENTS

| | | |
|---|---|---|
| DE | 195 09 413 C2 | 9/1996 |
| DE | 196 20 699 C1 | 11/1997 |
| DE | 197 28 349 A1 | 1/1999 |
| DE | 199 13 561 A1 | 9/2000 |
| DE | 102 50 873 B4 | 5/2004 |
| GB | 1 595 804 | 8/1981 |
| GB | 2 238 664 A | 6/1991 |
| JP | 55131638 A | 10/1980 |

* cited by examiner

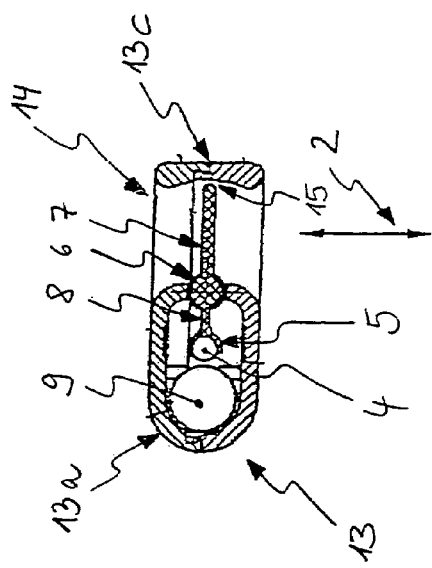
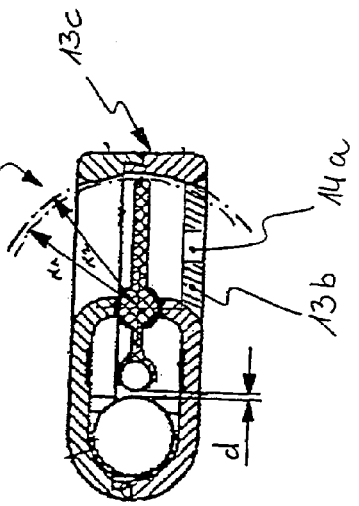
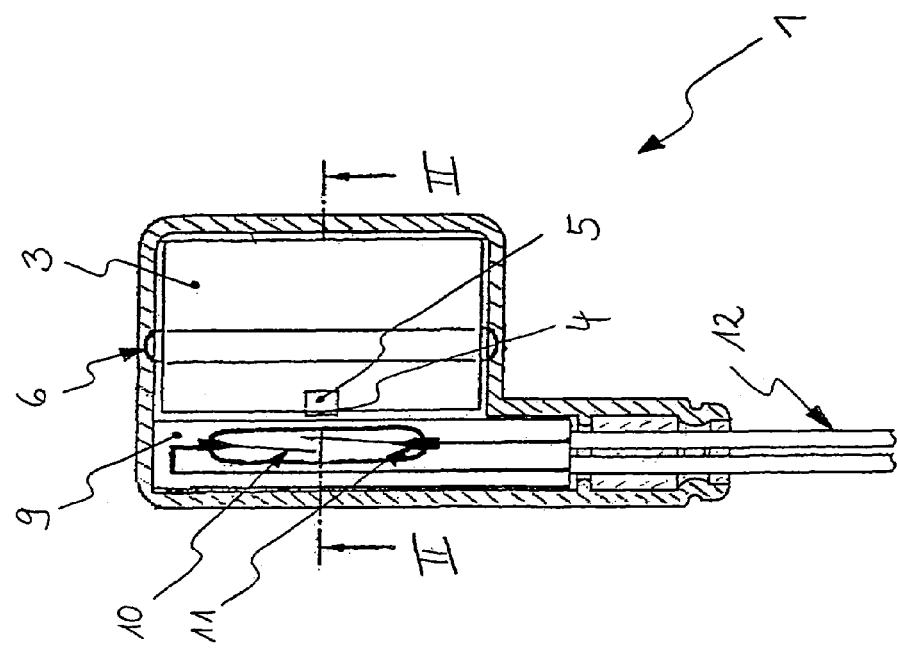
FIG. 2a
FIG. 2b
FIG. 1

DEVICE FOR MONITORING AN AIR SUPPLY FLOW OR A VOLUMETRIC AIR FLOW

This is the U.S. national phase of International Application No. PCT/EP03/12101 filed Oct. 30, 2003, the entire disclosure of which is incorporated herein by reference.

The invention relates to a device for monitoring an air supply flow or a volumetric air flow.

Apparatus that contains electrical and/or electronic components, e.g. switch cabinets, must as a rule be air-conditioned or actively ventilated. Such forced ventilation serves to circulate the air in the switch cabinet and move it past the components in a targeted manner, because not only the thermal emission from the installed components but also the heat exchange with the surroundings could produce a climate within the cabinet that would put the functionality of its contents at risk. To ensure continuous ventilation, what is needed in addition to the actual air-flow generating mechanism is a supplementary control unit that monitors the ventilating operation by checking the air supply flow or volumetric air flow.

At present devices for monitoring an air supply flow or a volumetric air flow are often supplied in a purely electronic construction. As a rule, these operate according to the thermodynamic principle. That is, a measurement sensor is heated by an internal source so as to create a temperature difference between the sensor and the medium flowing past it. Because energy is extracted from the sensor by the flowing medium, the state of flow of the medium can be derived therefrom. Devices of this kind demand a very complex electronic system, which is extremely expensive and can function smoothly only in dependence on certain influential variables. For instance, specially designed sensors are needed, e.g. sensors with relatively large mass, when the flow to be recorded is quite small, because the sensors customarily used do not respond in this case. As a consequence, because of the interaction of the additional mass and the slight flow, it is necessary to allow for prolonged response times. Therefore if the system operation is disturbed by insufficient ventilation, it will take a long time before this can be noticed.

Other kinds of devices for monitoring the air supply flow or the volumetric flow comprise mechanically operating components, for instance components that are displaced when air flows against them, so that their change of position provides information about the medium to be monitored. In order to move these approach-flow detectors back to the original position other mechanical components, e.g. springs, are needed. Additional components of this kind, however, increase the susceptibility of the monitoring device to damage, e.g. on account of greater wear and tear. In particular, it is difficult to design the spring arrangement so as to ensure that the air current can be monitored despite a very wide range of flow velocities and/or throughput rates.

The object of the present invention is to provide a device for monitoring an air supply flow and/or a volumetric air flow in the simplest manner that will ensure high reliability.

The invention provides a device for monitoring an air supply flow or a volumetric air flow comprising an approach-flow component adapted to be struck by an air flow that is to be monitored so as to produce a change in its position; a holder on which the approach-flow component is mounted but relative to which the approach-flow component can change its position against a retaining force $F_M$; magnet components adapted to produce a magnetic field dependent on the position of the approach-flow component, the force of said magnetic field forming at least part of the retaining force $F_M$; detection means adapted to detect the magnetic field; and measurement means adapted to generate a measurement signal that depends on the strength of the magnetic field.

It is a feature of the invention that the approach-flow component, the position of which is changed by the impinging air flow, is subject to a restoring force when the flow velocity decreases and/or the throughput rate becomes lower, owing to the magnetic retaining force $F_M$. This restoring force returns the approach-flow component to its initial position, with no need for a separate repositioning mechanism to be provided.

Thus in a first preferred embodiment of the device it is provided that the magnet components comprise a permanent magnet. This brings about orderly operation of the device without the need for a separate supply of current, as would have been the case, e.g., for an electromagnet. The device can be manufactured simply and cost-effectively and is nearly maintenance-free. Fundamentally, however, an electromagnet can also fulfill the desired function.

Furthermore, as one of the preferred embodiments it is provided that the permanent magnet is mounted on the approach flow component, so that here, too, a simple and economical manufacture is ensured. Mounting the permanent magnet on the approach-flow component achieves a direct coupling of magnetic field and switching action, with no need for additional components.

Another possible implementation of the device involves mounting the permanent magnet on the holder and a magnetic, in particular ferromagnetic element on the approach-flow component. This protects the magnet on one hand, while on the other hand enabling a precisely specified quantity associated with the magnetic element to be used for extremely sensitive adjustment of the device to flow velocities and/or throughput rates.

In another advantageous embodiment of the device in accordance with the invention, the approach-flow component comprises a flap rotatably suspended in such a way that the air flow generates a moment of torque on the flap, about its axis of suspension. Such a flap can be mounted by simple means.

One solution in accordance with the invention provides that the approach flow component is equipped with at least one counterweight or similar mass-compensation element, so that it can be installed independently of position and gravity. Hence the device for monitoring an air supply flow or volumetric air flow can be mounted at any desired place and in any desired orientation. This is especially advantageous when there is not much room for it to be installed, or the places to be used are difficult to access.

In a special embodiment the mass compensation is implemented by an eccentric mounting of the approach-flow component. The advantageous aspect here is that no additional components need to be incorporated to serve for mass compensation, so that a simple and economical manufacture of the device is possible. Because of the savings in mass, furthermore, the approach-flow component can respond more rapidly to low flow velocities and/or throughput rates.

Alternatively or in addition, the counterweight can comprise at least parts of the magnet components. Here, again, the number of additional components needed as mass-compensation elements can thus be reduced, so as to ensure simple and economical manufacture of the device. The behavior of the approach-flow component in response to low flow velocities and/or throughput rates is likewise positively influenced.

Furthermore, as one of the preferred embodiments, it is provided that the measurement means comprise a reed contact, which is disposed in a reed-contact switch. The advantage here is that the reed contact responds to a magnetic field and therefore switches without mechanical actuation. Therefore the switch and the approach-flow component need not be connected to one another by leads, so that the device can be constructed in a compact, simple manner.

The reed-contact switch, in another embodiment, is disposed so that in a magnetic field it generates at least part of the retaining force $F_M$. Magnetic, in particular ferromagnetic elements, which are immanent in reed-contact switches, in themselves enable an attraction between switch and permanent magnet. This, again, allows a simple, compact and hence economical construction of the device, because no additional components are needed.

A preferred implementation of the device consists in providing adjustment means such that the retaining force $F_M$ can be adjusted. This results in optimization of the device to the most diverse flow velocities and/or throughput rates. In particular, limiting values can be set for flow velocities and/or throughput rates, as required. This is advantageous, for instance, when the spaces to be ventilated—e.g., switching cabinets containing heat-generating apparatus—have different dimensions and hence need different ventilation.

In a special embodiment of the device in accordance with the invention an adjustment of the retaining force $F_M$ is enabled by additional magnetic, in particular-ferromagnetic elements that can be introduced into the magnetic field. Consequently limiting values for flow velocities and/or throughput rates can be specified in the simplest possible way, so as to guarantee extremely reliable operation of the device.

Alternatively or additionally, the retaining force $F_M$ can be adjusted by positioning the reed-contact switch at different distances from the permanent magnet to form the adjustment apparatus. The differential spacing can, for example, be produced by simply shifting the permanent magnet on the approach-flow component. Thus no other elements are needed to adjust the retaining force $F_M$.

Another embodiment in accordance with the invention provides for alteration of an effective surface of the approach-flow component. The special advantage in this case is that the response sensitivity of the device can be varied.

In a special embodiment the housing is constructed in such a way that the effective surface of the approach-flow component can be changed by way of the housing, which serves as its holder. This can be achieved, for instance, by way of openings in the housing. Hence this makes it extremely economical to produce a series of such devices.

In another advantageous embodiment the approach-flow component is mounted in such a way that it is in its resting state when the permanent magnet is kept, by the retaining force $F_M$, at the shortest distance from the reed-contact switch. This ensures that the device can be configured as simply as possible.

In a preferred implementation of the device, the holder for the measurement means is designed to serve as a housing. As a result, the measurement means are protected from external influences and hence can operate reliably and precisely.

The invention will now be described by way of example with reference to the attached drawings.

FIG. 1 shows a longitudinal section of the device in accordance with the invention;

FIG. 2a shows a section along the line II—II in FIG. 1;

FIG. 2b is an enlargement of the section along the line II—II in FIG. 1.

The longitudinal section in FIG. 1 represents a special embodiment of the device 1 in accordance with the invention, for monitoring an air supply flow or volumetric air flow 2. Here an approach flow element is provided in the form of a pivotally mounted flap 3 to which is attached a permanent magnet 4 in a magnet holder 5. The flap 3 is suspended in a pivot bearing 6 and therefore is rotationally deflected by the air flow 2. The permanent magnet 4 is positioned on the axis of symmetry, perpendicular to the axis of rotation, at the edge of the flap 3.

Because the flap 3 is provided with at least parts of the magnetic elements—in this case the permanent magnet 4—the flap 3 must be provided with at least one counterweight or similar mass-compensating element, so that it can be installed without regard to the force of gravity or to its orientation. Hence in the present drawing the flap 3 is disposed eccentrically, so that in this way a mass compensation on the basis of different-sized areas is ensured. In this exemplary embodiment an effective area section 7 is provided as compensatory surface—that is, the larger portion of the area of the flap 3, which interacts with the air flow 2. The permanent magnet 4 is disposed on a smaller area section 8.

The present drawing shows a reed-contact switch 9, which comprises reed contacts 10. The reed-contact switch 9 is preferably potted, in particular in order to protect the glass body. The current is supplied by way of leads 12. The switch 9 in this case is arranged so that the interaction between the permanent magnet 4 and the reed contacts 10 in the magnetic field generates at least part of the retaining force $F_M$. In addition, the contact holders 11, which as a rule are made of an iron-nickel alloy, can interact with the magnetic field of the permanent magnet 4.

The exemplary embodiment comprises adjustment means that allow the retaining force $F_M$ to be adjusted. As can be seen in FIG. 1, the initial setting of the retaining force $F_M$ is accomplished extremely simply by selecting a particular distance d, between the reed-contact switch 9 and the permanent magnet 4, that is appropriate for an intended detection behavior of the device 1.

FIGS. 2a and 2b show a section along the line II—II in FIG. 1. FIG. 2b is an enlargement of FIG. 2a, to make some details clearer. The pivotally mounted flap 3, the permanent magnet 4, the magnet holder 5 and the reed-contact switch 9 are shown here again, in plan view. The smaller area portion 8, the permanent magnet 4 in the magnet holder 5 and the reed-contact switch 9 are disposed in the interior of the closed housing part 13a, and accordingly are protected thereby. The device 1 also comprises both inflow and outflow openings 14, by way of which the air flow 2 is diverted through the device 1.

As shown in FIGS. 2a and 2b, the device 1 comprises between the movable flap 3 and a lateral housing part 13c a sealing gap 15, because the lateral housing part 13c on the side facing the flap 3 is shaped with a radius $r_2 = r_1 + x$, according to which the radius $r_2$ is larger by a value x than a radius $r_1$ of the circle described by the effective area portion 7 of the flap 3 as it makes its pivotal movement. Now, if a lengthwise housing part 13b, as shown in FIG. 2b, is set into an opening 14 of the housing, the result is a smaller opening 14a and reduced flow through the sealing gap 15, so that the pressure drops and the device becomes less sensitive.

The operating principle of the arrangement is as follows:

An air flow 2 passes through the inflow opening 14 and reaches the effective area portion 7 of the rotatably mounted flap 3. Because of the pivot bearing 6 in which the flap 3 is suspended—rather like a rocker—the air flow 2, in this exemplary embodiment, exerts a moment of torque on the flap 3, tending to rotate it about its axis of suspension. That is, the yielding movement of the flap 3, induced by the air flow 2, is a pivotal movement. The device 1 is constructed such that both a blowing and a sucking air flow 2 can be detected. For this purpose the flap 3 can be deflected in a rightward as well as a leftward direction of rotation. Then the inflow and outflow openings 14 operate inversely. In the resting state the flap 3 is kept in its resting position because of the interaction of the magnetic field of the permanent magnet 4 with the magnetic material in the reed-contact switch 9. The reed contact 10 is closed by the magnetic field of the permanent magnet 4 and, if desired, can induce a warning signal. If a blowing or sucking air flow 2 is present, it must now deflect the flap 3 against the magnetically acting retaining force $F_M$. When this occurs, the permanent magnet 4 is moved away from the reed contact 10, so that the latter opens on account of the weakening magnetic field. The interruption of the circuit then signals that the ventilation is in order. If the flow velocity and/or throughput rate of the air flow 2 decreases, the flap 3 will again approach its resting position, because the retaining force $F_M$ acts as a restoring force when the flap 3 is in a deflected state. As mentioned above, no additional restoring mechanism is needed to return the flap 3 to its initial position; the interaction between the magnetic material in the reed-contact switch 9 and the magnetic field of the permanent magnet 4 suffices to move the flap 3 back. As soon as the flap 3 again approaches the reed contact 10, the latter closes and can, if desired, again trigger a warning mechanism. The concept of the "approach" of the flap 3 to the reed contact 10 should be regarded differently, depending on the desired detection behavior of the device 10. The alternatives for construction and mode of action of the device 1 that are explained below will provide further information in this regard.

In general it is possible to construct the approach-flow component not as a rotatably mounted flap 3 but rather as a plate, the position of which could be changed by a translational movement. Then the plate would, for instance, be guided on rails or be held by several magnets and pushed or sucked along by an air flow 2.

The permanent magnet 4 can in principle also be replaced by an electromagnet, which would likewise be fixed within the magnet holder 5. The leads that supply the electromagnet with current could then, for instance, run through the interior of the pivot bearing.

When the permanent magnet 4 is used, it could also be fixedly attached to a holder associated with the housing 13. The magnet holder 5 would then serve to carry a supplementary magnetic, in particular ferromagnetic element, which in this case would complete the magnet component.

As described above, the flap 3 must be provided with at least one counterweight or similar mass-compensation element, in order to compensate for additional masses, such as that of the permanent magnet 4. This mass compensation can also be implemented by measures other than the eccentric arrangement of the flap 3. If the mounting of the flap 3 is concentric, its two areas could be made of different materials, so that the difference in their densities would amount to a mass compensation. Cutting out some of the flap material or attaching additional elements would also have a compensatory effect.

FIGS. 1, 2a and 2b show an exemplary embodiment in which the retaining force $F_M$ is initially adjusted by selecting a distance d between reed-contact switch 9 and permanent magnet 4 that is appropriate for an intended detection behavior of the device 1. In the example presented here the distance d is constant, but it is entirely possible for it to be made alterable. To that end, the housing 13 would have to be constructed such that the flap 3 could be variably inserted into the housing 13. By enlarging the distance d of the permanent magnet 4 from the reed-contact switch 9, for instance, the retaining force $F_M$ would be overcome even by low flow velocities and/or throughput rates, thus enabling a change in the position of the flap 3. The opening 14 could also be altered by a covering, either in the form of part of the housing 13 that is attached thereto by permanent connection of the materials or as a removable piece. Here the phrase "permanent connection of the materials" is meant to denote connections formed by classical methods such as welding or the use of adhesives, as well as every other means of connecting things, in particular including the construction of an integral housing 13. It would now be possible to regulate the pressure or suction of the air flow 2, and hence the response sensitivity of the device 1, in dependence on the sizes of the opening 14a and the sealing gap 15. Additional magnetic, in particular ferromagnetic elements would allow further adjustment of the retaining force $F_M$ by altering the interaction between the magnetic element and the magnetic field of the permanent magnet 4. Preferably the magnetic element would be disposed in the reed-contact switch 9, in order to reinforce the magnetic action of the contacts 10. Variation of the magnetic field induced by the electromagnet also presents another possible means of adjusting the retaining force $F_M$.

In the present exemplary embodiment, shown in FIGS. 1, 2a and 2b, the leakage at the sealing gap 15 is kept as small as possible by configuring the lateral housing part 13c so that its shape approximates the path along which the effective surface portion 7 of the flap 3 moves as it is deflected. Additional elastomer sealing lips or brushes could restrict the leakage still further, but in some circumstances would increase the friction. The solution that is best in any given case depends on the situations for which the device 1 is to be employed. It would be entirely possible to make the sealing gap wider intentionally, so that the deflection of the flap 3 would begin only at a particular minimal flow velocity and/or throughput rate of the air flow 2. Then if the flow velocity and/or throughput rate is below that limit, because of the intentional leakage not enough impact pressure will build up to cause the flap 3 to be deflected.

LIST OF REFERENCE NUMERALS

1 Device for monitoring an air supply flow or a volumetric air flow
2 Air flow
3 Flap
4 Permanent magnet
5 Magnet holder
6 Pivot bearing
7 Effective area portion
8 Smaller area portion
9 Reed-contact switch
10 Reed contacts
11 Contact holders
12 Leads
13 Housing
13a Closed-off part of housing 13b Lengthwise part of housing
13c Lateral part of housing
14 Openings
14a Reduced opening
d Distance
$r_1$ Radius 1
$r_2$ Radius 2

The invention claimed is:

1. Device for monitoring an air supply flow or a volumetric air flow, comprising
   an approach-flow component adapted to be struck by an air flow that is to be monitored so as to produce a change in its position;
   a holder on which the approach-flow component is mounted but relative to which the approach-flow component can change its position against a retaining force $F_M$;
   magnet components adapted to produce a magnetic field dependent on the position of the approach-flow component, the force of said magnetic field forming at least part of the retaining force $F_M$;
   a detector adapted to detect the magnetic field; and
   a signal generator adapted to generate a measurement signal that depends on the strength of the magnetic field,
   wherein the approach-flow component is provided with at least one counterweight so that it can be installed regardless of the force of gravity and of its position.

2. Device according to claim 1, wherein the magnet components comprise a permanent magnet.

3. Device according to claim 2, wherein the permanent magnet is attached to the approach-flow component.

4. Device according to claim 2, wherein the permanent magnet is fixedly attached to the holder and a magnetic element is attached to the approach-flow component.

5. Device according to claim 1, wherein the approach-flow component comprises a flap rotatably suspended in such a way that the air flow exerts a moment of torque, on the flap, about its axis of suspension.

6. Device according to claim 1, wherein the approach-flow component is eccentrically seated and a larger area portion of the approach-flow component is provided as said counterweight.

7. Device according to claim 1, wherein the counterweight comprises at least parts of the magnet components.

8. Device according to claim 1, wherein the measurement means comprises a reed contact, which is disposed in a reed-contact switch.

9. Device according to claim 8, wherein the approach-flow component is mounted in such a way that it is in a resting state when the magnet component is retained by the retaining force $F_M$ at the shortest distance to the reed-contact switch.

10. Device according to claim 8, wherein the reed-contact switch is disposed in such a way that in the magnetic field it generates at least part of the retaining force $F_M$.

11. Device according to claim 10, wherein the position of the reed-contact switch can be adjusted with respect to its distance from the permanent magnet in order to provide an adjustment means whereby the retaining force $F_M$ can be adjusted.

12. Device according to claim 1, wherein adjustment means are provided so that the retaining force $F_M$ can be adjusted.

13. Device according to claim 12, wherein the adjustment means comprise additional magnetic elements that can be brought into the magnetic field.

14. Device according to claim 12, wherein an effective area of the approach-flow component can be altered.

15. Device according to claim 14, wherein the housing is constructed in such a way that the effective area of the approach-flow component can be altered by constructing the holder as a housing.

16. Device according to claim 1, wherein the holder is constructed as a housing and the measurement means are disposed in the housing.

* * * * *